N. S. McFARLAND.
Spout for Coffee-Pots.
No. 163,502. Patented May 18, 1875.
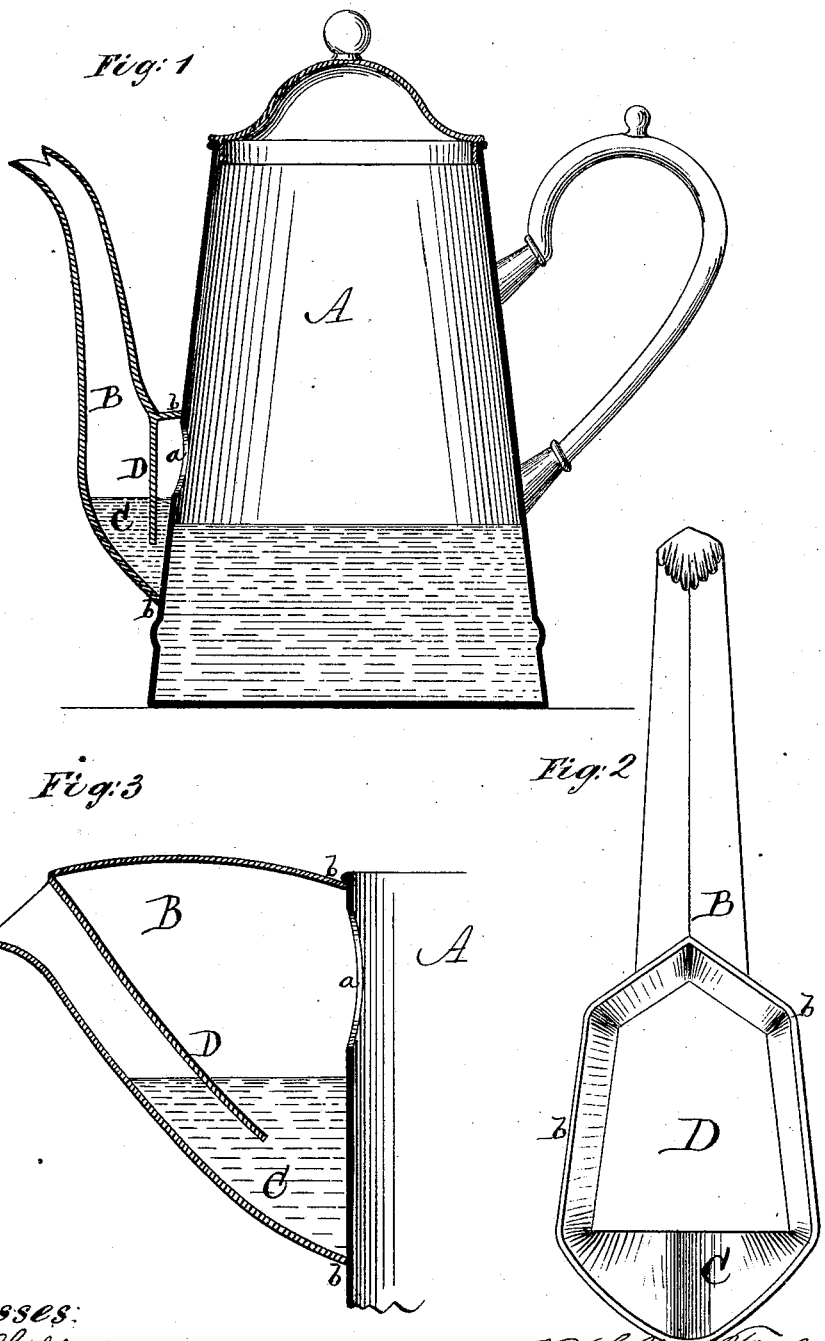

UNITED STATES PATENT OFFICE.

NATHANIEL S. McFARLAND, OF NEW YORK, N. Y.

IMPROVEMENT IN SPOUTS FOR COFFEE-POTS.

Specification forming part of Letters Patent No. 163,502, dated May 18, 1875; application filed April 26, 1875.

*To all whom it may concern:*

Be it known that I, NATHANIEL S. MCFARLAND, of the city, county, and State of New York, have invented certain Improvements in Spouts for Coffee-Pots and other Vessels; and I do hereby declare that the following is a full, clear, and exact description of the same, reference being had to the accompanying drawing, which forms part of this specification.

My invention relates to a spout which is intended more especially for coffee-pots, but which may be applied to other vessels.

The invention consists in a novel construction of the spout, whereby, when attached to a coffee-pot or other vessel, a chamber is formed in the spout below the outlet from the body of the vessel, and communicating therewith by a channel, so that a quantity of liquid is always contained in the chamber, and the escape of aroma from the vessel is prevented, whether the liquid in the vessel is above or below the outlet.

In the accompanying drawing, Figure 1 is a vertical section of a coffee-pot with my improved spout attached. Fig. 2 is a rear view of the spout, detached. Fig. 3 is a vertical section, showing a modification of the invention.

A represents a coffee-pot of any suitable construction. B is the improved spout, which may be made of any kind of metal or any suitable material. The portion $b$ of the spout which is attached to the pot is made considerably larger than the opening $a$ in the pot with which it communicates, and is attached in such a position that the opening $a$ is in the upper part of the portion $b$, and the lower end of the spout extends considerably below the lower edge of the opening $a$, and forms a chamber, C. From the top and sides of the chamber C a diaphragm, D, extends down into the chamber beyond the lower edge of the opening $a$, the edges of the diaphragm, except the lower edge, being attached closely to the sides of the chamber; or, if desired, the diaphragm may be made in one piece with the spout. The space between the diaphragm D and the side of the vessel below the outlet $a$ constitutes a channel, connecting the chamber C and the body of the vessel.

When the liquid in the pot or vessel A extends up higher than the opening $a$ a portion of said liquid will always remain in the chamber C. When only a small quantity of coffee is in the pot, and it does not extend up as high as the opening $a$, a small quantity of water may be poured down the spout sufficient to fill the chamber C as high as the lower edge of the opening. Thus the diaphragm D and chamber C, containing the liquid, constitute a trap, which effectually prevents the escape of any of the aroma from the pot.

The spout thus constructed is applicable to tea-pots and other vessels as well as to coffee-pots.

The form of the spout may be varied to some extent without changing the nature of the invention, as shown; for example, in Fig. 3, which illustrates, even better than Fig. 1, one of the principal advantages of the invention, viz., that the communication of the spout with the pot may, without any loss of aroma by escape through the spout, be made as near as may be desired to the top of the pot, and enables the liquid to be poured from the upper part, where it is clearest. The form of spout shown in Fig. 1, however, allows the spout-connection to be made near the top of the pot.

What I claim as new, and desire to secure by Letters Patent, is—

A spout constructed as herein described, so as to form, when attached to a vessel, a chamber, C, below the outlet $a$, and a channel connecting said chamber with the body of the vessel, whereby said chamber is enabled to constantly hold a quantity of liquid, and thereby prevent the escape of aroma, whether the liquid in the body of the vessel stands above or below the outlet $a$, substantially as set forth.

N. S. McFARLAND.

Witnesses:
BENJAMIN W. HOFFMAN,
FRED HAYNES.